US008260467B2

(12) United States Patent
Altemark et al.

(10) Patent No.: US 8,260,467 B2
(45) Date of Patent: Sep. 4, 2012

(54) METHOD AND SYSTEM FOR DETERMINING THE COMPATIBILITY OF CONTROL SOFTWARE WITH A WIND ENERGY INSTALLATION

(75) Inventors: Jens Altemark, Rendsburg (DE); Markus Book, Kiel (DE); Anton Kupper, Heide (DE)

(73) Assignee: REpower Systems AG, Hamburg (DE)

( * ) Notice: Subject to any disclaimer, the term of this patent is extended or adjusted under 35 U.S.C. 154(b) by 546 days.

(21) Appl. No.: 12/235,436

(22) Filed: Sep. 22, 2008

(65) Prior Publication Data

US 2009/0102196 A1 Apr. 23, 2009

(30) Foreign Application Priority Data

Sep. 21, 2007 (DE) .......................... 10 2007 045 070

(51) Int. Cl.
*G06F 3/00* (2006.01)
*G06F 15/177* (2006.01)
(52) U.S. Cl. .......................... 700/286; 709/220; 700/287
(58) Field of Classification Search .................. 700/287, 700/286; 709/221, 220; 717/170–173; 710/8; 715/772; 307/72
See application file for complete search history.

(56) References Cited

U.S. PATENT DOCUMENTS

| 6,035,423 | A | 3/2000 | Hodges et al. |
| 6,658,659 | B2 * | 12/2003 | Hiller et al. .................... 717/170 |
| 6,754,885 | B1 * | 6/2004 | Dardinski et al. ............ 717/113 |
| 7,269,829 | B2 * | 9/2007 | Smith et al. .................... 717/168 |
| 7,752,617 | B2 * | 7/2010 | Blinick et al. ................ 717/170 |
| 7,873,441 | B2 * | 1/2011 | Synesiou et al. ............... 700/286 |
| 7,899,558 | B2 * | 3/2011 | Kuhls et al. ...................... 700/11 |
| 7,908,348 | B2 * | 3/2011 | Kumar et al. ................. 709/220 |
| 8,032,614 | B2 * | 10/2011 | Riesberg et al. ............. 709/220 |
| 2005/0090937 | A1 | 4/2005 | Moore et al. |
| 2007/0118626 | A1 * | 5/2007 | Langen ......................... 709/221 |
| 2009/0192868 | A1 * | 7/2009 | Rajiv et al. ...................... 705/10 |

FOREIGN PATENT DOCUMENTS

| CN | 1755629 | 4/2006 |
| CN | 1838602 | 9/2006 |
| CN | 101013372 | 8/2007 |
| EP | 0668553 | 4/1998 |
| EP | 1788478 | 5/2007 |
| EP | 1788478 A2 * | 5/2007 |

OTHER PUBLICATIONS

Svensson, J., et al. (2002). "Wind Farm Control Software Structure", *Industrial Electrical Engineering and Automation (IEA), Lund University*: 1-15.

* cited by examiner

*Primary Examiner* — Dave Robertson
(74) *Attorney, Agent, or Firm* — Morrison & Foerster LLP

(57) ABSTRACT

A method and a system are for determining of the compatibility of control software, which is designed for standard parameters, with a wind energy installation which is operated using operating parameters. The method is an automatic method in which the operating parameters of the wind energy installation and the standard parameters of the control software are first transmitted to a computation unit. The computation unit determines discrepancies between the operating parameters and the standard parameters. A decision on compatibility is made on the basis of the discrepancies. The system includes a logic module which is designed to make the decision. This method makes it easier to automatically update the control software for a wind energy installation. There is no longer any need to manually check the compatibility of the new version of the control software before the new version of the control software can be installed.

15 Claims, 3 Drawing Sheets

METHOD AND SYSTEM FOR DETERMINING THE COMPATIBILITY OF CONTROL SOFTWARE WITH A WIND ENERGY INSTALLATION

REFERENCE TO RELATED APPLICATIONS

This application claims the priority of German Patent Application No. 10 2007 045 070.4, filed Sep. 21, 2007, the contents of which are incorporated herein by reference.

FIELD OF THE INVENTION

The invention relates to a method and an arrangement for determination of the compatibility of control software, which is designed for standard parameters, with a wind energy installation which is operated using operating parameters. Wind energy installations are operated with control software which controls the interaction of the components within the wind energy installation, as well as the interaction of the wind energy installation with the connecting grid system. The control software must comply with the constraints subject to which the wind energy installation operates. It is necessary to take account of the components with which the wind energy installation is equipped, what voltages are permissible, the power levels at which the wind energy installation may be operated, the natural frequency of the wind energy installation tower, the operating mode in which the emitted sound from the wind energy installation is at its lowest, and so on. All of these constraints are defined by operating parameters for the wind energy installation. The operating parameters are taken into account by the control software.

BACKGROUND OF THE INVENTION

From time to time, the control software for a wind energy installation is replaced by a new version of the control software. In the traditional procedure, an operator successively addresses the individual wind energy installations via a dataline from a control centre, transmits the new version of the software to each individual wind energy installation, and installs the software by manually input commands. The process of updating the software takes about 1.5 hours for each wind energy installation. The time spent by the operator and the shutdown time of the wind energy installation result in considerable costs.

EP 1 788 478 A2 discloses a method for automatic updating of the control software for a plurality of wind energy installations. There, the new version of the control software is transmitted once from a control centre to a farm master to which a plurality of wind energy installations are connected. The farm master successively addresses the individual wind energy installations and transmits the new version of the control software to the wind energy installations. This reduces the amount of data transmitted between the control centre and the farm master. This results in a considerable time saving since the dataline between the control centre and the farm master is in many cases designed only for a low transmission rate.

The advantages of the method according to EP 1 788 478 A2 are evident when all the wind energy installations that are connected to the farm master are operated using identical operating parameters. The control software can then be designed for the relevant operating parameters, and can be played back to the individual wind energy installations successively, without any further adaptations.

However, the precondition that all of the wind energy installations which are connected to the farm master are operated using the same operating parameters is not always satisfied. This is true even when the wind energy installations are in principle of the same type. For example, the components of the wind energy installations may differ, for example the generators or the gearboxes. A wind energy installation which is arranged at the top of a hill may be equipped with a different hazard beacon than that on a wind energy installation arranged on the slope. Variations of this type can lead to the operating parameters of the wind energy installation differing. Adaptations may be required to the new version of the control software in order to allow it to be used for a wind energy installation with different operating parameters.

In the method according to EP 1 788 478 A2, the wind energy installations which are operated with different operating parameters must be manually segregated. The farm master must be instructed to jump over these wind energy installations when automatically updating the control software. This is tedious and involves a high potential for errors since all of the different wind energy installations may not be identified.

Problems with the compatibility of the control software can occur not only when the control software is being updated but also when the operating parameters of the wind energy installation change even though the control software remains the same. By way of example, the operating parameters of a wind energy installation may change when a mechanic carries out maintenance work on the wind energy installation and in the process changes settings which affect the operating parameters. Until now, the mechanic has had to tediously check by hand whether the settings that have been changed lead to problems relating to the compatibility of the control software.

SUMMARY OF THE INVENTION

Against the background of the initially described prior art, the invention is based on the object of providing a method and an arrangement for determination of the compatibility of control software with a wind energy installation, which simplify the procedures for updating of the control software and for maintenance of wind energy installations. The object is generally achieved by the features of the invention as broadly described herein. Advantageous embodiments can be found in the detailed description below.

The method according to the invention is an automatic method which comprises the following steps:
 a. transmission of the operating parameters of the wind energy installation to a computation unit;
 b. transmission of the standard parameters to a computation unit;
 c. determination of discrepancies between the operating parameters and the standard parameters by the computation unit;
 d. decision on compatibility on the basis of the discrepancies.

First of all, a number of terms will be explained. An operating parameter of a wind energy installation is any parameter which represents a characteristic of a wind energy installation in a form which allows processing by control software. The operating parameters comprise constants, characteristics, mathematical functions, value tables, serial numbers or type identifications of the wind energy installation or of its components.

When control software is processing parameters, then the parameters must have predetermined values or must be within predetermined ranges for the control software to operate in the intended manner. When the control software is being created, this includes a definition of the standard parameters for which the control software is intended, that is to say which are the standard parameters of the control software. If control software operates with parameters which are not standard parameters, then, depending on the severity of the discrepancies, this can lead to incorrect operation of the wind energy installation.

The method according to the invention has the advantage that it keeps the effort and therefore the costs low. Using the standard parameters and the operating parameters, only small amounts of data need be transmitted to the computation unit. The computation unit can use a standardized procedure to determine discrepancies between the operating parameters and the standard parameters. The method according to the invention saves a number of steps which until now have had to be carried out manually. The risk of operator errors, which in some circumstances are serious, is reduced.

In order to allow the compatibility test to be carried out automatically for example by a logic module, criteria must be predetermined on the basis of which a decision could be made on the compatibility. In the simplest case, the result of the compatibility test is positive only if all the operating parameters match the standard parameters. Any discrepancy leads to a negative result of the compatibility test. There are situations in which the control software is compatible with the wind energy installation, despite there being a discrepancy between the operating parameters and the standard parameters. The efficiency of the method according to the invention is improved by predetermining criteria on the basis of which it is automatically possible to decide whether compatibility still exists despite a discrepancy. Criteria such as these may be predetermined in the form of compatibility classes, which are associated with the standard parameters. The compatibility classes may be used to react differently, depending on the severity of the discrepancy.

For example, four compatibility classes may be associated with the standard parameters: in the first compatibility class, the control software is transferred without any query, despite a discrepancy. In the second compatibility class, the control software is likewise transferred without any query, but a message is passed to a control centre. In the third compatibility class, a discrepancy means that the control software can be transferred only after an express command from the control centre. In the fourth compatibility class, the control software is incompatible in the event of a discrepancy.

The method can be applied for a version of the control software with which the wind energy installation has already previously been operated, that is to say for an active version of the control software. This can be done, for example, when the operating parameters of a wind energy installation have changed after maintenance work. Another reason for a compatibility test using the method according to the invention may be that the wind energy installation is intended to be operated for the first time with a new version of the control software. In both situations, a multiplicity of steps which were previously carried out manually are saved.

A plurality of versions of the new software may be provided. The logic module can then use the operating parameters to choose a version of the new software in which the standard parameters and the operating parameters match.

The control software can be designed such that individual standard parameters or all the standard parameters must have an exactly defined value. For example, the situation can occur in which control software can interact with only one specific type of transformer or one specific type of converter. It is likewise possible for it to be sufficient for the operating parameters to be within specific ranges for the control software. This may apply, for example, to the maximum permissible voltage in the components of the wind energy installation. The standard parameters then comprise parameter ranges.

It is possible for various operating parameters of the wind energy installation to be dependent on one another in the control program. By way of example, a specific temperature may still be permissible in a first gearbox type, while the limit value of the permissible temperature has already been exceeded in a second gearbox type. Relationships such as these can be taken into account by representing the standard parameters by a standard parameter matrix.

The method according to the invention for determination of the compatibility of the control software may be an element of a method using which the control software for a wind energy installation is updated. If the result of the compatibility test is positive, a new version of the control software is then transmitted to the wind energy installation, and the wind energy installation is operated using the transmitted control software. The method for updating the control software can be carried out automatically. If the compatibility decision is positive, a signal is then transmitted to a monitoring unit and is used as the basis for automatically starting the transmission of the control software.

While the control software is being transmitted to the wind energy installation, the wind energy installation may be placed out of operation. However, this is not essential and in fact the wind energy installation can also still continue to be operated during this process using the old version of the control software.

In one advantageous embodiment, the wind energy installation is also not placed out of operation when the control software is being installed on the wind energy installation and when the control unit of the wind energy installation is being switched from the old version of the control software to the new version of the control software. To do this, the new version of the software is first of all installed in a passive memory area of the control unit. Once the installation in the passive memory area has been completed, then the control unit can be instantaneously switched over by means of a switching module such that the passive memory area becomes the active memory area without the wind energy installation having to be placed out of operation. If required, a separate safety device may be provided which checks the wind energy installation during the switching process and after it, and which switches the control unit back again to the previously active memory area if it finds any irregularities in operation with the new version of the control software. If the irregularities are such that they cannot be overcome even by switching back to the old version of the control software, then the safety device can initiate emergency stopping of the wind energy installation. The switching module can be designed such that it chooses a time at which the wind energy installation is in a stable operating state for switching the control unit from one memory area to the other. For example, switching does not take place between the two memory areas when the wind energy installation is currently subject to high wind speeds and faults during switching of the control software could lead to overloading of the wind energy installation. The control software is therefore advantageously switched below a predetermined wind speed, for example below the switch-on speed. The switching of the control software can also be made dependent on other environmental values being within predetermined limits. Alternatively, the switching of the software can be delayed in an automated manner until the wind energy installation is not feeding any energy into the connecting grid system, for example because of calm wind conditions or because of a fault in the electrical grid system. This makes it possible to avoid an additional failure in power generation or operation of the wind energy installation. The idea of keeping the wind energy installation in operation during switching to the new version of the software may be made independent of whether the compatibility of the control software with the operating parameters has been tested. This applies both to a corresponding method and to a wind energy installation with the components which are used to carry out the method.

The method according to the invention for determination of the compatibility of the control software may also be an element of a method by means of which the control software of a plurality of wind energy installations is updated. The standard parameters of a new version of the control software are then transmitted to a farm master, to which a plurality of wind energy installations are connected. The farm master may be any device which carries out control tasks for a plurality of wind energy installations. The compatibility of the control software is then tested successively or else in parallel for the individual wind energy installations, with the farm master addressing the wind energy installations for this purpose. If the result of the compatibility test is positive, the new version of the control software is transmitted by the farm master to the wind energy installations. The wind energy installations are then taken into use with the new version of the control software.

The invention also relates to an arrangement by means of which the compatibility of control software which is designed for standard parameters with a wind energy installation which is operated using operating parameters can be determined. The arrangement comprises a computation unit by means of which discrepancies between the operating parameters and the standard parameters can be determined. A logic module is also provided, by means of which the compatibility can be determined on the basis of the determined discrepancies.

The arrangement may also comprise a farm master to which a plurality of wind energy installations are connected. If the computation unit is arranged at the farm master, this has the advantage that only a single computation unit is required for a plurality of wind energy installations. Alternatively, each individual wind energy installation may also be equipped with a computation unit.

The farm master may comprise a monitoring unit which controls the computation unit. The monitoring unit can be used to control the computation unit such that it determines discrepancies between the standard parameters and the operating parameters successively or in parallel for a plurality of wind energy installations. The monitoring unit can also be designed to transmit a new version of the control software to the wind energy installations if the result of the compatibility test is positive. Furthermore, it can be designed to use the operating parameters to select an appropriate version of the control software from a plurality of versions, and to transmit this to the wind energy installations.

BRIEF DESCRIPTION OF THE DRAWINGS

The invention will be described by way of example using one advantageous embodiment in the following text and with reference to the attached drawings, in which.

DETAILED DESCRIPTION OF THE INVENTION

Figure 1:
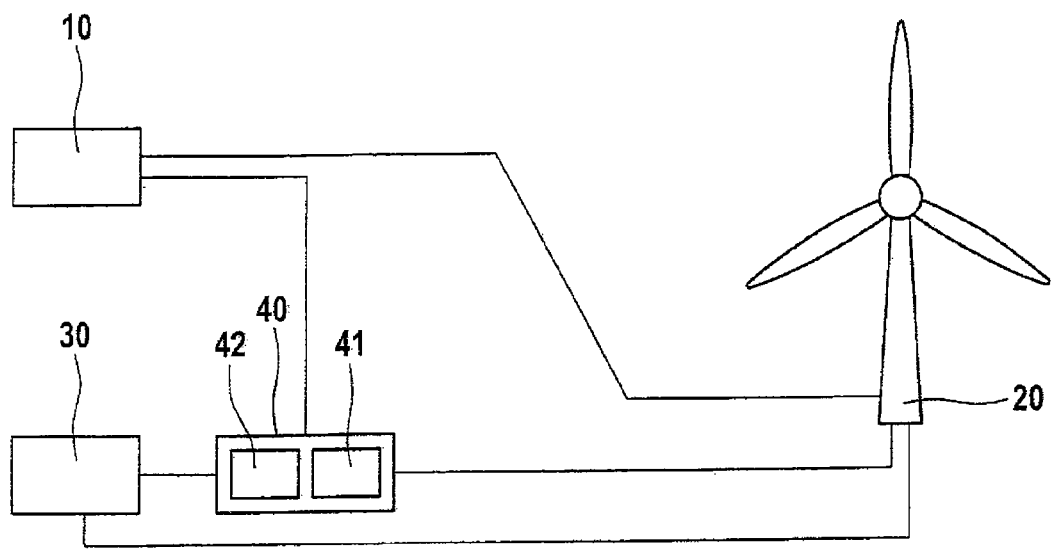
FIG. 1 shows an arrangement for determination of the compatibility and updating of the control software for a wind energy installation.

A wind energy installation 20 is operated with control software which controls the procedures within the wind energy installation as well as the interaction of the wind energy installation with the connecting grid system. The characteristics of the wind energy installation 20 are reflected in a multiplicity of operating parameters. By way of example, the following list indicates a selection of operating parameters of a wind energy installation:

| | |
|---|---|
| Type identification | MM92 |
| Serial number | 123456789 |
| Electrical power | 2000 kW |
| Rotor diameter | 92 m |
| Gearbox type | Type G2 |
| Transmission ratio | 1:120 |
| Hub height | 80 m |
| Height above sea level | 1080 m |
| Converter type | Type U5 |
| Rating of the converter | 400 kW |
| Selected power factor | 0.98 |
| Controller type | Type C3 |
| Current software number | V 3.205 |

The type G2 gearbox may be subject to the problem that it is susceptible to oscillate at a specific rotation speed and a specific torque. This problem is taken into account in the control software by operating the wind energy installation 20 either at a somewhat higher rotation speed or a somewhat lower rotation speed at the relevant torque. The other operating parameters for the characteristics of the wind energy installation 20 are relevant in a comparable manner.

The control software for the wind energy installation 20 is continuously being developed further. For example, the development department may have the task of revising the control software such that the grid connection behaviour of the wind energy installation is changed slightly. The development department will be aware that wind energy installations of the MM type are normally equipped with one of the gearbox types G1, G2, G3 or G4. Since the intended change to the grid connection behaviour has no influence on the oscillation behaviour of the gearbox, the development department can state without any difficulties that the new version of the control software will be compatible with all the gearbox types G1, G2, G3 and G4. The gearbox types G1, G2, G3 and G4 are therefore compatible with standard parameters of the new version of the software.

In addition to this, when revising the control software, it may even be irrelevant what gearbox type is used in the wind energy installation. Thus, if an individual wind energy installation of the MM type is being used anywhere, which is experimentally equipped with a G5 gearbox, then the control software can nevertheless be transferred. The development department therefore knows that any discrepancy in the "gearbox type" standard parameter will have no influence on the compatibility, and will allocate an appropriate compatibility class to this standard parameter. One option would be to choose the compatibility class 0, such that the control software can be transferred without any query. Alternatively, the compatibility class 1 may be considered, in which the control software is likewise transferred without any query, but a message is sent to the control centre.

A list of standard parameters and associated compatibility classes created by the development department could, for example, be in the following form:

| Standard parameter | Value | Comp. class |
| --- | --- | --- |
| Type identification | MM92, MM82 | 3 |
| Serial number | 12345000-12345999 | 3 |
| Electrical power | 1500-2500 kW | 0 |
| Rotor diameter | 92 m, 82 m | 1 |
| Gearbox type | Type G1, G2, G3, G4 | 1 |
| Transmission ratio | 1:120 | 0 |
| Hub height | 68-100 m | 2 |
| Height above sea level | 0-1000 m | 1 |
| Converter type | Type U1, U5 | 3 |
| Rating of the converter | 400 kW | 1 |
| Selected power factor | 1-0.90 | 0 |
| Controller type | Type C2, C3 | 3 |
| Current software number | V 3.1-3.21 | 3 |

The meanings of the compatibility classes are as follows:

| Compatibility class | Meaning |
| --- | --- |
| 0 | Irrelevant for compatibility |
| 1 | Irrelevant for compatibility, but message required to the control centre |
| 2 | Probably relevant for compatibility, software can be transferred only with the agreement of the control centre |
| 3 | Rejection criterion, software cannot be transferred |

The compatibility class will always be relevant when a discrepancy has been determined between the operating parameters and the standard parameters. The compatibility class can be used to automatically decide whether the new version of the control software can be transferred despite the discrepancy, or what reaction is required.

In this example, the wind energy installation is 1080 m above sea level, while the control software is designed for a standard parameter range from 0 m to 1000 m. This discrepancy relates to a standard parameter in compatibility class 1. The control software can therefore be transferred without any query despite the discrepancy, but a message to the control centre is required.

FIG. 1 shows an arrangement which is designed to carry out the method according to the invention. A wind energy installation 20 is connected to a control centre 10 and to a server 30. A new version of the control software with the associated standard parameters is stored on the server 30. A computation unit 41 and a logic module 42 are also provided, and are arranged in a common unit 40. The unit 40 is connected to the control centre 10, to the server 30 and to the wind energy installation 20.

Figure 3:
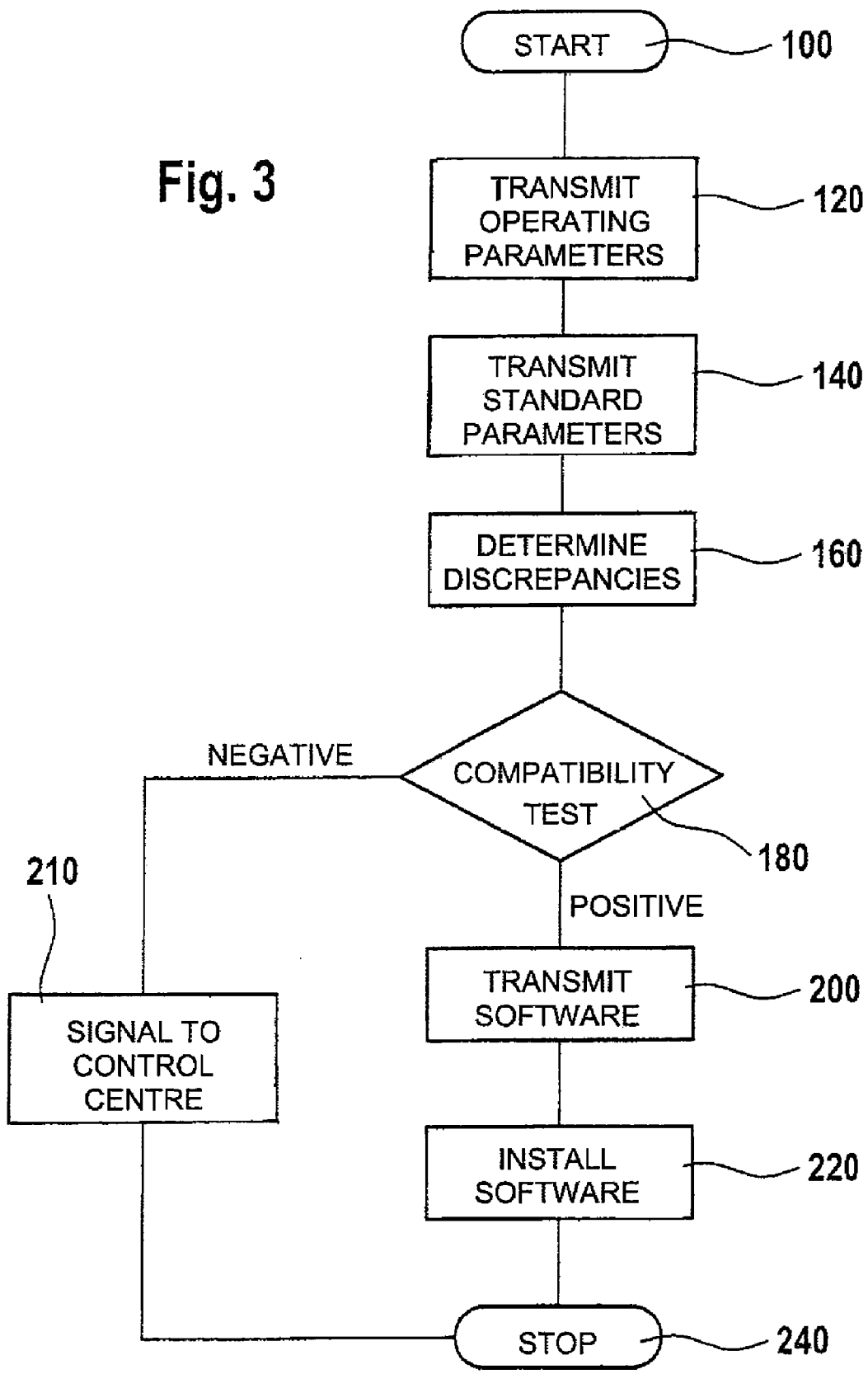
FIG. 3 shows a flowchart of a method for determination of the compatibility and updating of the control software for a wind energy installation.
Figure 4:
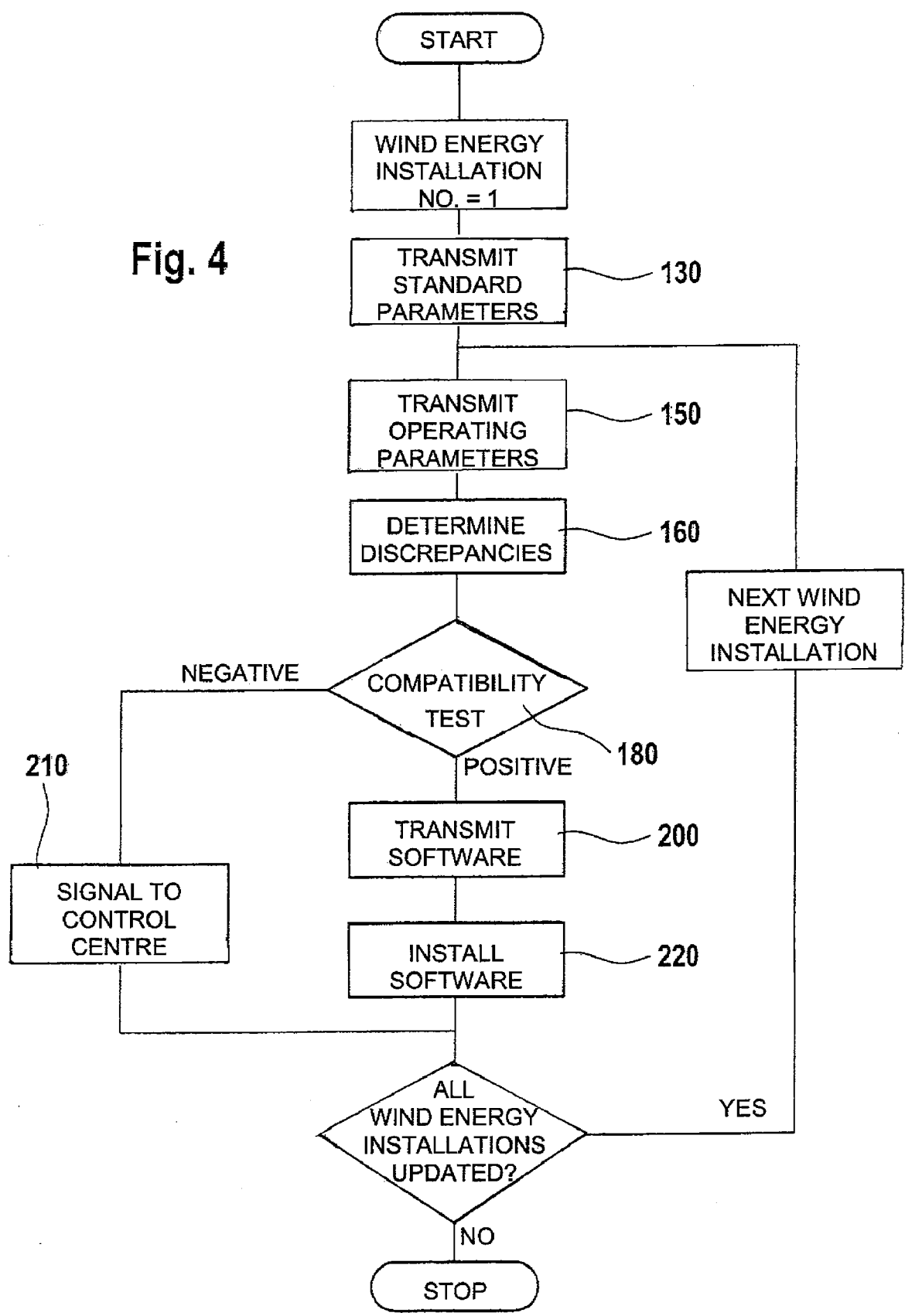
FIG. 4 shows a flowchart of a method for determination of the compatibility and updating of the control software for a plurality of wind energy installations.

In order to determine the compatibility and to update the control software, a command is first of all transmitted in accordance with the procedure shown in FIG. 3 from the control centre 10 to the wind energy installation 20, in order to protect the operating parameters and to prepare for transmission. Then, in step 120, the operating parameters are transmitted from the wind energy installation 20 to the computation unit 41. The standard parameters associated with the new version of the control software are then transmitted in step 140 from the server 30 to the computation unit 41. The computation unit 41 compares the operating parameters with the standard parameters, and determines any discrepancies (step 160).

In step 180, the logic module 42 uses the discrepancies which have been determined to carry out a compatibility test. The compatibility test has a positive result if there is no discrepancy between the operating parameters and the standard parameters or if, despite the discrepancies being determined between the operating parameters and the standard parameters, the discrepancies relate, however, to standard parameters in compatibility classes 0 or 1. The new version of the control software is transmitted to the wind energy installation 20 in step 200 and is installed on the wind energy installation 20 in step 220. In the event of any discrepancy in a standard parameter in compatibility class 1, a message is sent in parallel to the control centre. The wind energy installation 20 is operated with the new version of the control software. The wind energy installation 20 can be kept in operation while the new version of the software is being installed.

If the discrepancy determined in step 160 relates to a standard parameter in compatibility class 2 or 3, the new version of the control software cannot be transferred with no further action. In compatibility class 2, an express command is required for the control centre 10 in order to allow the control software to be transferred despite the discrepancy. If the discrepancy relates to a standard parameter in compatibility class 3, then the discrepancy is so serious that the control software cannot be transferred.

Figure 2:
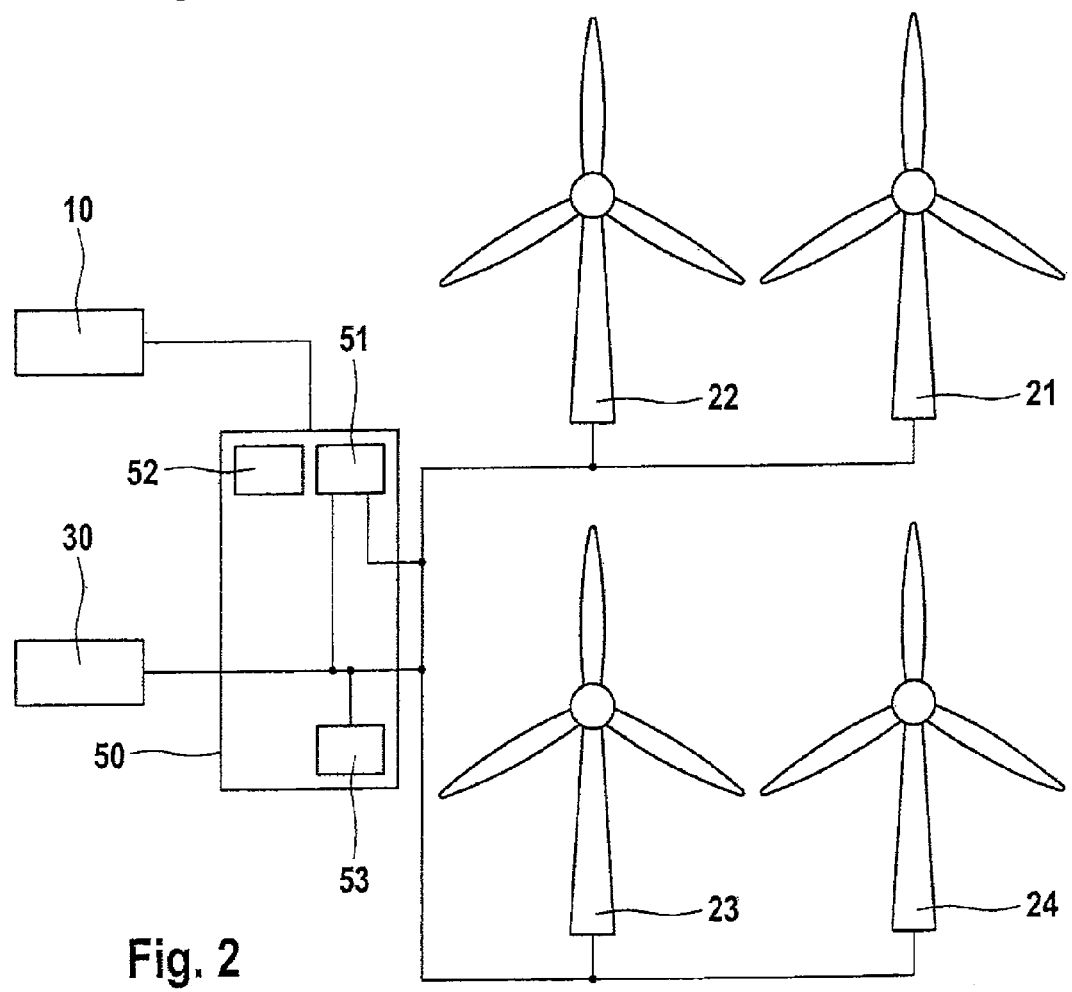
FIG. 2 shows an arrangement for determination of the compatibility and updating of the control software for a plurality of wind energy installations.

The arrangement shown in FIG. 2 is designed to check the compatibility of the control software for a plurality of wind energy installations 21, 22, 23, 24. A farm master 50 is provided, to which the plurality of wind energy installations 21, 22, 23, 24 are connected. The farm master 50 comprises a computation unit 51, a logic module 52 and a monitoring unit 53. In response to a command from the control centre 10, the standard parameters are transmitted from the server 30 to the farm master 50 in step 130. The monitoring unit 53 addresses a first of the wind energy installations 21, 22, 23, 24 and causes the operating parameters for the relevant wind energy installation, for example the wind energy installation 21, to be transmitted to the farm master 50 in step 150. The computation unit 51 in the farm master 50 compares the operating parameters with the standard parameters and determines the discrepancies, step 160. If the compatibility test carried out in step 180 leads to a positive result, the new version of the control software is transmitted to the wind energy installation 21 in step 200, and is installed on the wind energy installation 21 in step 220. There is no need to place the wind energy installation 21 out of operation in this time. The steps of checking the compatibility and updating the control software are controlled by the monitoring unit 53, and there is no need for any intervention from the control centre 10. A message is sent to the control centre in step 210 only if a discrepancy in a standard parameter from one of the compatibility classes 1 to 3 has been determined.

When the method has been completed for the wind energy installation 21, the corresponding steps are carried out successively for the wind energy installations 22, 23, 24, controlled by the monitoring unit 53. The method is complete once all of the wind energy installations in the wind farm have been addressed and either the new version of the control software has been transferred or the compatibility test has had a negative result.

The invention claimed is:

1. A method for automatically determining compatibility of control software which is designed for standard parameters with a wind energy installation which is operated using operating parameters, comprising:
   transmitting the operating parameters of the wind energy installation from the wind energy installation to a computation unit;
   transmitting the standard parameters to a computation unit;
   determining discrepancies between the operating parameters and the standard parameters by the computation unit;
   deciding the compatibility of the control software with the wind energy installation on the basis of the discrepancies; and
   transmitting the control software to the wind energy installation only if the result of the compatibility test is positive.

2. The method of claim 1, wherein the standard parameters are associated with compatibility classes, and wherein, in the event of a discrepancy between the operating parameters and the standard parameters, the deciding of compatibility is made on the basis of the compatibility classes.

3. The method of claim 1 or 2, wherein the deciding of compatibility is made by a logic module.

4. A method for automatic updating of control software of a wind energy installation, comprising:
   transmitting operating parameters of the wind energy installation from the wind energy installation to a computation unit;
   transmitting standard parameters of a new version of the control software to a computation unit;
   determining discrepancies between the operating parameters and the standard parameters by the computation unit;
   deciding the compatibility of the new version of the control software with the wind energy installation on the basis of the discrepancies;
   transmitting the new version of the control software to the wind energy installation only if the result of the compatibility test is positive; and
   starting up the wind energy installation with the transmitted new version of the control software.

5. The method of claim 4, wherein the wind energy installation is kept in operation while the new version of the control software is transmitted to the wind energy installation.

6. The method of claim 4 or 5, wherein the wind energy installation is kept in operation while switching to the new version of the control software.

7. The method of claim 4 or 5, wherein the starting up with the transmitted control software is delayed until the wind speed is below a predetermined limit value.

8. The method of claim 4 or 5, wherein the wind energy installation is taken into operation with the transmitted new version of the control software at a time at which no power is being fed into the connecting grid system.

9. A system for automatic determination of compatibility of control software which is designed for standard parameters with a wind energy installation which is operated using operating parameters, comprising a computation unit for determination of discrepancies between the operating parameters received from the wind energy installation and the standard parameters, a logic module for determining the compatibility on the basis of the determined discrepancies, and a transmission unit for transmitting the control software to the wind energy installation only if the result of the compatibility test is positive.

10. The system of claim 9, further comprising a farm master to which a plurality of wind energy installations are connected, the computation unit being provided at the farm master.

11. The system of claim 10, wherein the farm master has a monitoring unit which is configured to control the computation unit such that discrepancies between the standard parameters and the operating parameters of a plurality of wind energy installations are determined.

12. The system of claim 11, wherein the monitoring unit is configured to autonomously transmit a new version of the control software to the wind energy installations in which the compatibility test has had a positive result.

13. The system of claim 9, 10, 11, or 12, comprising a control unit for the wind energy installation with two memory areas which are separated from one another and configured for different versions of the control software.

14. The system of claim 13, comprising a switching module that is configured to switch the operation of the wind energy installation from a version of the control software which is stored in the first memory area to a version of the control software which is stored in the second memory area.

15. A method for automatically updating control software which is designed for standard parameters of a plurality of wind energy installations which are operated using operating parameters and are connected to a farm master, comprising:
   transmitting the standard parameters and a new version of the control software to the farm master;
   transmitting the operating parameters of each wind energy installation from each wind energy installation to a computation unit;
   determining discrepancies between the operating parameters and the standard parameters by the computation unit;
   determining compatibility of the new version of the control software with the plurality of wind energy installations being operated by the farm master on the basis of the determined discrepancies;
   transmitting the new version of the control software to the wind energy installations only if the compatibility test has led to a positive result, with the farm master controlling the transmission; and
   starting up the wind energy installations with the new version of the control software.

* * * * *